United States Patent [19]

Zurbuchen et al.

[11] 4,102,640
[45] Jul. 25, 1978

[54] PROCESS FOR THE PROCESSING OF ORGANIC TEXTILE MATERIALS

[75] Inventors: Jacques Zurbuchen, Pratteln; Paul Dussy, Basel, both of Switzerland

[73] Assignee: Ciba-Geigy Corporation, Ardsley, N.Y.

[21] Appl. No.: 741,274

[22] Filed: Nov. 12, 1976

Related U.S. Application Data

[63] Continuation of Ser. No. 561,513, Mar. 24, 1975, abandoned.

[30] Foreign Application Priority Data

Mar. 29, 1974 [CH] Switzerland ............... 4424/74

[51] Int. Cl.$^2$ ............... D06P 5/02; B08B 3/00
[52] U.S. Cl. ............... 8/73; 8/21 A; 8/21 B; 8/21 C; 8/22; 8/54.2; 8/74; 8/149.1; 8/149.3; 8/177 R; 8/178 R; 8/179
[58] Field of Search ............... 8/73, 149.3, 149.1, 8/74

[56] References Cited

U.S. PATENT DOCUMENTS

| | | | |
|---|---|---|---|
| 1,796,039 | 3/1931 | Mijer | 8/149.2 |
| 1,907,429 | 5/1933 | Masland | 8/149.3 |
| 2,205,958 | 6/1940 | McGhee et al. | 8/144 |
| 2,235,165 | 3/1941 | Platt | 8/149.3 |
| 2,446,502 | 8/1948 | Wehrli | 8/149.3 |
| 3,504,999 | 4/1970 | Drago | 8/54 |
| 3,614,798 | 10/1971 | Serbin | 8/166 |
| 3,762,866 | 10/1973 | Rayment et al. | 8/149.1 |
| 3,804,590 | 4/1974 | Fleissner | 8/149.1 |
| 3,835,490 | 9/1974 | Fleissner | 8/149.1 |

FOREIGN PATENT DOCUMENTS

| | | |
|---|---|---|
| 2,177,914 | 11/1973 | France. |
| 2,214,409 | 9/1973 | Fed. Rep. of Germany. |
| 6,460,201 | 4/1965 | Netherlands. |
| 472,915 | 7/1969 | Switzerland. |
| 1,411,556 | 10/1975 | United Kingdom. |
| 1,411,557 | 10/1975 | United Kingdom. |
| 1,411,558 | 10/1975 | United Kingdom. |
| 1,419,125 | 12/1975 | United Kingdom. |
| 591,493 | 8/1947 | United Kingdom. |

*Primary Examiner*—A. Lionel Clingman
*Attorney, Agent, or Firm*—Edward McC. Roberts; Prabodh I. Almaula

[57] ABSTRACT

Described is a process for the processing of organic textile materials by application of an aqueous dispersion or solution of a processing agent having affinity for the fibres, with a ratio of goods to liquor of at most 1:2, and subsequent fixing of the processing agent by means of a steam treatment, characterized in that the ratio of goods to liquor of the applied liquor is increased, below the absorption temperature of the processing agent, by the admission of saturated steam in such a manner that the processing agent is uniformly dispersed on the material before commencement of the fixing process.

The advantages of this process are that there are used practically no products contaminating the waste liquors, particularly no surface-active substances tending to form foam, and that there are nevertheless obtained perfectly satisfactory processing effects. Surprisingly, moreover, irregularities caused by the material are levelled out during dyeing.

9 Claims, No Drawings

PROCESS FOR THE PROCESSING OF ORGANIC TEXTILE MATERIALS

This is a continuation of application Ser. No. 561,513, filed on Mar. 24, 1975 now abandoned.

The invention relates to a process for the processing of organic textile materials, as well as to the textile material processed by means of the process.

Processes by which organic textile materials are processed with the use of low goods-to-liquor ratios are known. These liquors contain surface-active substances such as, e.g., foam-forming compounds. The disadvantages of these processes are that the employed surface-active substances contaminate the waste liquors, particularly during washing out of the processed textile materials, and render more difficult the purification of these wasteliquors in clarifying plants; and that with the application of foam-forming compounds, moreover, these restrict or make quite impossible the flow of material in large processing plants such as "JET".

There has now been found a process which surprisingly does not have these disadvantages, i.e. in which preferably no additional surface-active substances are used, and in which the ratio of goods to liquor is not brought to the required value until during the processing operation. This new process of the invention is used for processing organic textile materials, and is characterised by the application of an aqueous dispersion or solution of a processing agent having affinity for the fibres, in a ratio of goods to liquor of at most 1:2, to the said material, and subsequent fixing of the processing agent by means of a steam treatment that is so designed that the ratio of goods to liquor of the applied liquor is increased, below the absorption temperature of the processing agent, by the admission of saturated steam in such a way that the processing agent is uniformly dispersed on the material before commencement of the fixing process.

The procedure for carrying out this process according to the invention is in detail as follows:

The processing liquor in a ratio of goods to liquor of 1 : 0.3 to 1 : 2, preferably 1 : 0.8 to 1 : 1.5, is applied at room temperature to the material to be processed, which material is advantageously in closed and/or pressure-tight plants such as JET, in winch vats or in dyeing machines. The application of this processing liquor to the material is advantageously effected by atomising or by spraying, by impregnating or by padding. In the case of atomising or spraying, the processing liquor not taken up by the material is fed back, e.g. by means of a pump, to the material until the liquor has been completely absorbed by the material. For a better dispersion of the processing liquor, it is advantageous to mechanically keep the material moving or, alternatively, to maintain the processing liquor in motion with the material stationary. After the whole of the liquor has been applied to the material, this is subjected to a saturated-steam treatment. This treatment offers the possibility of increasing the ratio of goods to liquor, by condensation of the steam, advantageously 1.2-fold to 4-fold, with the proviso that the final ratio of goods to liquor does not exceed the value of 1:5 and that no free liquor is formed. The "enlarged" goods-to-liquor ratio is advantageously in the range of 1 : 0.9 to 1 : 4. Furthermore, the saturated-steam treatment effects the heating up of the textile material, treated with processing liquor, to the fixing temperature of the processing agent, which temperature, on the other hand, is dependent on the substrate and on the processing agent. Saturated steam is introduced advantageously within 5 to 60 minutes, especially within 10 to 45 minutes, whereby simultaneously, depending on the substrate, an increase in temperature from initially about 20° C to 140° C, advantageously to 98° to 130° C, is obtained. The admission of saturated steam must be controlled in such a way that the processing agent is uniformly dispersed on the textile material before the actual fixing process commences. After the saturated-steam treatment, the textile material is rinsed, and finished off in the known manner.

It is to be emphasised that the processing agent is used according to the invention in the form of an aqueous dispersion or solution containing water and the processing agent, but preferably no additional surface-active substances.

The widest variety of processing agents having affinity for the substrate are suitable for the process according to the invention. Any agent that can be applied to the substrate by spraying, atomising or slop-padding is suitable for the purpose, such as, e.g.: dyestuffs, optical brighteners, softening agents, agents imparting dirt-repellent properties, moth-proofing agents, water-proofing agents and fire-proofing agents, agents rendering the material fast to rubbing and antistatic agents. It is also possible to use agents for rendering the material shrink-proof, for desizing, for rendering the material crease-proof and for bleaching.

These processing agents are used in the usual form for aqueous application. They can be soluble or insoluble in water; in the latter case, they are used in the finely divided form and dispersed practically uniformly throughout the liquor.

The processing operation according to the invention can be applied to all types of textile materials which are, for example, in the form of piece-goods, fabrics, knitwear, non-woven materials, yarn, textile floor coverings or tufted carpet material. These can contain synthetic, semi-synthetic or natural (vegetable or animal) materials such as, e.g., natural polyamide fibres such as wool or silk, synthetic polyamide fibres such as nylon 6, nylon 66, nylon 6/66 or nylon 11; polyurethane fibres; natural cellulose fibres such as cotton and linen; regenerated cellulose fibres such as viscose rayon or cuprammonium rayon; cellulose-2½- and -triazetate fibres; polyolefin fibres or the basic or acid modifications thereof; acrylonitrile-polymerisate fibres and mixed polymerisate fibres, e.g. those having an acrylonitrile content of at least 80%; fibres made from polyvinyl compounds, such as mixed polymerisates of vinylidene chloride; fibres of linear aromatic polyesters such as the polycondensation products of terephthalic acid and glycols, especially ethylene glycol and 1,4-di-(hydroxymethyl)-cyclohexane; and mixtures of the above-mentioned fibres such as polyester/wool, polyester/cotton and polyester/spun rayon.

The advantages of this process according to the invention are that there are used practically no products contaminating the waste liquors, particularly no surface-active substances tending to form foam, and that there are nevertheless obtained perfectly satisfactory processing effects. Surprisingly, moreover, irregularities caused by the material are levelled out during dyeing.

The following examples illustrate the invention. The temperature values are given in degrees Centigrade. The dyestuffs, particularly disperse dyestuffs, are advantageously used in their commercial form. By the term 'goods to liquor ratio' is meant the ratio of material (in kg) to liquor (liquid medium with processing agent) in liters.

EXAMPLE 1

80 kg of textured polyester knitted fabric made from 100% Dacron in 4 pre-washed and dried samples stitched together is placed into a Jet, in which the material is transported by a flow of air (Gaston-County USA).

400 g of the dyestuff of the formula

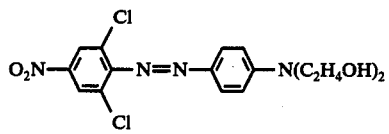

56 g of the dyestuff mixture of the formula

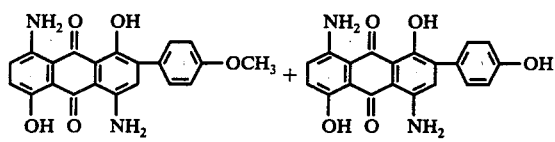

240 g of the dyestuff of the formula

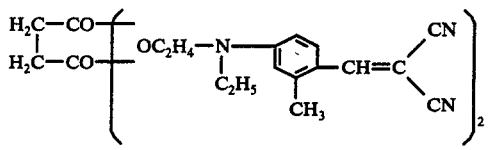

100 g of ammonium sulphate and
40 ccm of 80% aqueous formic acid are dispersed in an amount of warm water, and the dispersion is made up with cold water to 96 liters. By means of a pump, the dyestuff solution is atomised and applied at room temperature for 15 minutes to the material continuously turning at 350 meters per minute and being carried by a flow of air (ratio of goods to liquor 1 : 1.2). After completion of the application of the dyestuff solution, saturated steam is blown through an injection nozzle into the completely closed plant in such a way that the temperature increase obtained per minute is approx. 3°. There occurs on the cold material a condensation up to 98°, with the ratio of goods to liquor increasing to about 1:2.

The injection of saturated steam is continued under pressure conditions until 130° is attained, and this condition is maintained for 30 minutes.

The material is not surrounded by any kind of free liquor and is merely wetted uniformly.

Finally, the temperature is slowly lowered to 70° and the material is rinsed by the spraying-on of water in a goods-to-liquor ratio of 1:6. The rinsing water flowing off is colourless. After final finishing has been performed, there is obtained a level brown-dyed material having very good fastness properties.

EXAMPLE 2

If the starting ratio of goods to liquor in Example 1 is increased from 1 : 1.2 to 1 : 1.8, the procedure otherwise being as described, then in this case too there occurs, after admission of the saturated steam, an increase in the goods-to-liquor ratio on the material to about 1 : 2.5, Again there is obtained material which is dyed a level brown and which possesses good fastness properties.

EXAMPLE 3

If the procedure is carried out as described in Example 1 except that the starting ratio of goods to liquor is reduced from 1 : 1.2 to 1 : 0.3, and saturated steam is injected only intermittently, so that there is produced a heating-up rate of 2° per minute up to a temperature of 100°, and from 100° to 130° a heating-up rate of 4° per minute, then the ratio of goods to liquor increases to about 1 : 1.2.

After final finishing of the dyeing, there are obtained piece-goods dyed in a level brown shade.

EXAMPLE 4

The dyeing arrangement given in Example 1 is used except that, instead of the polyester knitted fabric, a knitted fabric made from polyamide Helanca is dyed using the following procedure:

80 g of the dyestuff of the formula

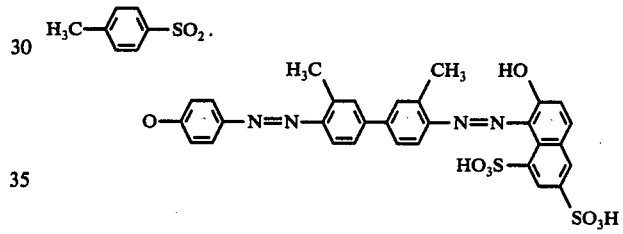

and 200 g of ammonium sulphate are dissolved in 120 liters of water; this liquor is atomised, by means of a pump, through an atomising nozzle and applied for 15 minutes to the material being rotated in the apparatus at a speed of 350 m/min. (ratio of goods to liquor 1 : 1.5). After the material has been rotated for a further 10 min., saturated steam is injected in such a way as to obtain a heating-up rate of 2°/min.; the goods-to-liquor ratio increases during the heating-up period as a result of the immediately occurring condensation, and the dyeing becomes completely levelled out before fixing conditions are established. With attainment of a temperature of 98° to 100°, the good-to-liquor ratio has doubled to about 1:3. After a further 15 minutes at 100°, the material is cooled to 70° and rinsed with water in a goods-to-liquor ratio of 1:4, and subsequently washed.

The waste-liquor is undyed and is completely free from surface-active substances.

There are obtained, after completion of the dyeing, level, brilliantly dyed light-red Helanca specimens having good fastness to light and to washing.

EXAMPLE 5

1 kg of cotton tricot shirts is placed dry into a dyeing drum (Everest Segrate, Milan).

10 g of the dyestuff of the formula

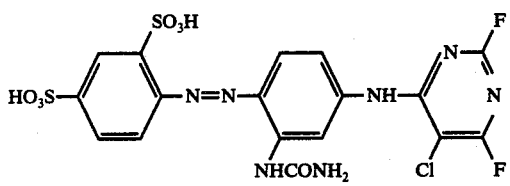

is dissolved in 1000 ml of hot water. There is added to this dyestuff solution 40 g of sodium sulphate, and the quantity is made up with water to 2000 ml. This dyestuff solution is atomised by means of an atomising nozzle and applied during 15 minutes to the cotton tricot shirts (ratio of goods to liquor 1:2). The continuously rotating material is heated with saturated steam to a temperature of 90° and this temperature is maintained for 20 minutes. The dye liquor during this time increases as a result of condensation to double the original amount to give a ratio of goods to liquor of about 1:4. After cooling to 70° and after a short intermediate centrifuging, there is applied to the material by atomising an aqueous solution containing 25 g of sodium carbonate in 500 ml of water. During a further 10 minutes, the shirts are centrifuged at 70° and then rinsed twice with water at 80° with a ratio of goods to liquor of 1:4. After finishing and drying, there are obtained levelly dyed gold-yellow cotton tricot shirts having very good fastness to wet processing and to light.

EXAMPLE 6

The Jet dyeing plant as described in Example 1 is employed and is filled with 80 kg of dry Orlon jersey material. A liquor of 120 liters of water containing 400 g of the dyestuff of the formula

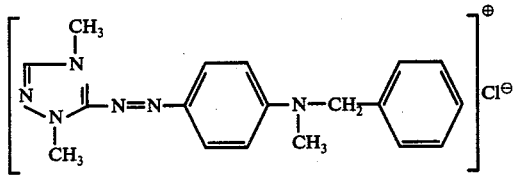

and 1600 ml of 80% acetic acid is prepared and sprayed, with a pump output of 8 liters per minute, for 15 minutes on to the material rotating in the plant at a speed of 360 m/min. (ratio of goods to liquor 1 : 1.5). As a result of the introduction of saturated steam to give a rate of temperature rise of 3° to 4°/minute, there is formed a ratio of goods to liquor of about 1:3 before attainment of the fixing temperature of 100°. At this point of time, the dyestuff is homogeneously dispersed. Fixing of the dyestuff is performed by maintaining the supply of saturated steam until the temperature is 100°, and holding this temperature for 30 minutes.

The material is carefully cooled to 70°, and is then rinsed with water in the ratio of goods to liquor of 1:4 for 10 minutes. After completion of the dyeing, there is obtained a levelly dyed light-red Jersey material having good fastness to light and to washing.

We claim:

1. A dyeing or finishing process for organic textiles, consisting of the steps of applying a liquor which is an aqueous dispersion or solution of a dye or finishing agent, having affinity for the textile, in the substantial absence of surfactants, to a textile at a goods to liquor ratio of 1:0.3 to 1.2, subsequently applying saturated steam to the textile to heat the textile and to dilute the liquor by condensation of the steam so as to uniformly distribute the liquor over the textile before a temperature is reached which would fix the dye or finishing agent to the textile fibers, provided that the diluted liquor is completely absorbed by the textile, and finally fixing the dye or finishing agent by the continued application of saturated steam.

2. The process of claim 1, wherein the liquor is applied at a goods-to-liquor ratio of 1:0.8 to 1:1.5.

3. The process of claim 1, wherein the liquor is an aqueous dispersion or solution of a dye.

4. The process of claim 1, wherein the liquor is applied at a ratio of goods to liquor of 1:0.3 to 1:2.

5. The process of claim 4, wherein the ratio of goods to liquor is increased by admission of saturated steam to 1.2 to 4 times its original value, with the proviso that the ratio of goods to liquor does not exceed the value of 1:5.

6. The process of claim 5, wherein the ratio of goods to liquor before the fixing step is 1:0.9 to 1:4.

7. The process of claim 1, wherein the application of saturated steam to the textile is carried out over a period of 5 to 60 minutes.

8. The process of claim 1, wherein the liquor is applied to the organic textile material by atomising or by spraying.

9. The process of claim 1, wherein the textile is polyester, polyamide, polyacrylonitrile or cotton, or mixtures thereof.

* * * * *

UNITED STATES PATENT AND TRADEMARK OFFICE
CERTIFICATE OF CORRECTION

PATENT NO. : 4,102,640
DATED      : July 25, 1978
INVENTOR(S) : Jacques Zurbuchen, et al It is certified that error appears in the above—identified patent and that said Letters Patent are hereby corrected as shown below:

In claim 1, column 6, line 19, "1.2" should read -- 1:2 --.

Signed and Sealed this

Eighteenth Day of March 1980

[SEAL]

Attest:

SIDNEY A. DIAMOND

Attesting Officer

Commissioner of Patents and Trademarks